United States Patent Office 2,767,730
Patented Oct. 23, 1956

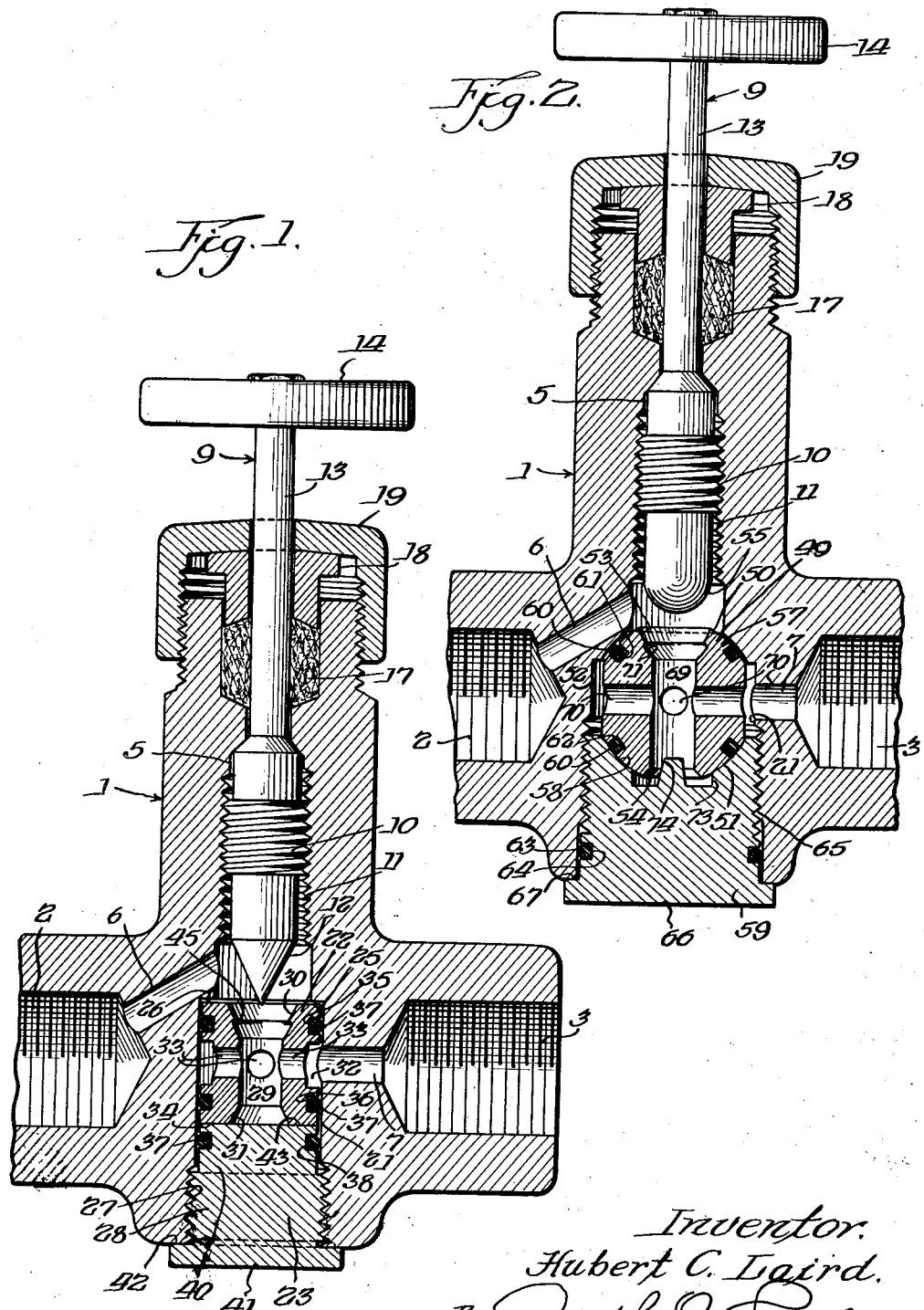

2,767,730

REVERSIBLE SEAT VALVE

Hubert C. Laird, Oak Park, Ill., assignor to Crane Co., Chicago, Ill., a corporation of Illinois Application April 1, 1953, Serial No. 346,188

6 Claims. (Cl. 137—329.02)

This invention relates generally to valves, and is more particularly concerned with what is termed needle type globe valves having preferably a one-piece body and bonnet and a seat bushing which is renewable through the bottom of the valve body.

It is one of the more important objects of this invention to provide a valve of the above type in which the valve seat or seat bushing is self-centering and easily adjustable for providing proper fluid tight seating engagement for relatively high pressure service, say of the order of three thousand pounds per square inch fluid pressure.

Another object is to provide a valve in which the seat ring or bushing is relatively loosely received within the valve casing and is free to shift or move transversely to the extent necessary for the needle valve or closure member to find its true seat.

A further object is to provide a valve having a seat ring or bushing which is free to turn or rotate relative to the valve casing and preferably with the one-piece stem and disc to minimize objectionable galling or cutting of the seating surfaces.

A still further object is to provide a valve having a replaceable seat ring which is relatively loosely received so as to be readily insertable or removable without the requirement of close tolerances, the said seat member being effectively and conveniently fluid sealed by the use of an O-ring or similar means between its periphery and a portion of the casing within which it is received.

Another object and one of primary importance is to produce a valve of the above type having an easily reversible seat ring or bushing provided with seating surfaces at opposite end portions thereof for convenient renewal by the mere reversal of the seat ring member; thus another object is to provide an arrangement giving longer life before actual replacement is necessary in addition to the convenience of having in effect a replacement part built into the valve and ready for immediate use when necessary.

A further object is to provide a valve having a reversible seat member in which the oppositely disposed seating surfaces are of varying sizes or diameters so as to make the seating contact with the closure member along different portions or segments of the latter for effecting new fluid tight contacts.

Other objects and advantages will become more readily apparent upon proceeding with a reading of the specification in which Fig. 1 is a sectional assembly view of a valve embodying my invention.

Fig. 2 is a view similar to Fig. 1, but showing a modified form of the invention.

Similar reference numerals refer to similar parts throughout the several views.

Referring to the drawing and particularly to Fig. 1 thereof, 1 designates a housing comprising a one-piece body and bonnet and provided with the usual inlet and outlet 2 and 3, respectively, each of which is internally threaded for connection to inlet and outlet pipes, not shown. A flange connection may, of course, be employed if desired. A recess or chamber 5 extends longitudinally or vertically through the body member. The inlet and outlet 2 and 3 communicate with this passageway by means of ports 6 and 7, respectively.

Preferably, but not necessarily, a one-piece stem and disc generally designated 9 is received within the valve chamber 5 having a threaded portion 10 for engagement with threads 11 of the body. The lower end of the stem is formed with a needle valve or disc closure portion 12, while the shank 13 thereof extends upwardly through an opening in the chamber 5 terminating in the usual handwheel 14 for rotation and reciprocation of the stem and disc. The usual packing 17, gland 18, and packing nut 19 provides a fluid tight seal around the upper part of the stem.

The valve chamber 5 is enlarged as at 21 for reception of a cylindrical ported seat ring member 22 and plug member 23, both of which are insertable from the lower open end of the passageway or chamber 5. The enlarged portion of the chamber which is cylindrical terminates at 25 forming an annular shoulder for abutting contact with the flat upper end or top 26 of the seat ring 22 when assembled in the valve as illustrated. The lower end of the chamber 5 is threaded at 27 for engagement with the threaded portion 28 of the plug member for retaining the seat member 22 in position.

The seat member 22 is provided with a passage 29 extending axially therethrough, which passage is formed with conical surfaces 30 and 31, respectively at the opposite ends thereof for effecting seating contact with the needle valve closure portion 12 depending upon which of the surfaces is uppermost in view of the reversibility of the seat bushing hereinabove referred to. The seat ring is preferably annularly relieved at 32 and is ported at 33 to permit passage of fluid through the seat member and into the outlet port 7 when the valve closure is in open position as shown. The bottom of the seat member is preferably flat at 34 for an abutting contact with the shoulder 24 when in the reversed position. The seat member is further relieved or grooved around the outer periphery at 35 and 36, respectively for reception of a pair of O-ring seals 37 for fluid sealing engagement of the seat member 22 within the enlarged chamber portion 21. It is to be understood that only the uppermost seal is effective for rendering fluid tightness, depending upon which way the seat member is positioned since the passage 29 extends entirely through the member. The retaining plug 23 is also grooved at 38 and is provided with an O-ring 37 to prevent the leakage of fluid past the threaded plug 23. Therefore, the threads 27 in the lower part of the plug need only be what is termed running threads and not such as to prevent leakage of fluid therepast.

The seat member 22 is of such size or diameter as to be relatively loosely received within the enlarged chamber portion 21 so as to be movable transversely or easily conformable normally to the axial direction or longitudinal stem movement for self-centering of the seat member with respect to the one-piece stem and disc by slight transverse shifting or movement of the seat member to the extent necessary for the needle valve or closure member to find its true seat for effecting tightness in relatively high pressure service. This arrangement also facilitates assembly or disassembly by permitting the seat member to be conveniently and easily slipped into and out of position within the valve. As for removal of the seat member 22, the latter member may be gripped through the ports 33 or preferably forced out or ejected by screwing the stem and disc all the way down, after removing the plug member 23.

In manufacturing, it will be clear that this arrangement alleviates the usual need of close tolerances, thereby making the valve considerably easier and less expensive to produce.

The upper portion 40 of the plug containing the O-ring is preferably of the same diameter as the seat ring 22, while the threaded portion 28 therebelow is slightly larger to provide for the threads thereon. The lower end of the retaining plug 23 is provided with a polygonal head 41 for turning of the member into and out of place. To prevent the seat ring 22 from being jammed up tight against the shoulder 25 of the chamber portion 21 so as to prevent side movement, the head 41 extends beyond the threaded portion forming a shoulder at 42 for limiting the inward movement of the plug. Being thus loosely held in position, the seat ring is shiftable sidewise for automatic adjustment to the needle valve and is also free to rotate with the same in the final closing of the valve, thereby to prevent galling or cutting of the seating surfaces. The upper surface 43 of the plug member 23 is made flat and smooth to permit the said rotatability.

It should be noted that the upper countersunk or conical surface 30 of the reversible seat member 22 is undercut or relieved at the inside annular edge, as at 45, while the lower conical surface 31 is not relieved, but is of smaller diameter. This arrangement provides for seating surfaces of different sizes or diameters for making seating contact of the two ends of the seat member with different portions or segments of the needle valve to thereby form entirely new seating contact upon reversal of the seat member. Thus, the surface shown uppermost in Fig. 1 engages the needle valve closure at a location unlike that of the annular surface shown at the lowermost limit, after reversal. Briefly, it should be clear that an entirely new seating contact is obtained upon such reversal of position of the seat member 22.

It should also be apparent that it makes no difference which way the seat ring 22 is inserted during assembly and that there is really no upper and lower conical surfaces, but that the annular surface which is uppermost as asembled is the one that is engageable with the needle valve. One of the advantages of the present valve is that care does not have to be exercised during initial assembly to see that the seat member is inserted in any particular position so far as its upper and lower end limits are concerned.

In the Fig. 1 form therefore, a renewable and reversible seat member has been provided which is free to rotate and to shift transversely.

It may be desirable, however, under certain circumstances, for more perfect adjustment of the closure member and fluid sealing engagement therewith, particularly for the higher pressures, to provide that the seat member also be permitted to cant and to rotate slightly relative to the vertical axis. Inasmuch as the seat bushing of the Fig. 1 form has flat end limits which, however mounted, tend to prevent canting or tipping when the closure member is screwed down tight, a substantially spherical seat member is provided in the modified form of Fig. 2 giving a ball and socket type of adjusting action when the spherical end closure member is brought down into tight engagement therewith and assuming that the seating surfaces are not axially aligned satisfactorily.

Referring now more particularly to Fig. 2, the valve therein illustrated is the same as that of Fig. 1, except for certain structural differences to be more fully described.

The reversible seat ring 49 is of spherical form, as already mentioned. More specifically, the upper and lower surfaces 50 and 51, respectively thereof form segments of a sphere. Ample clearance is provided at 52 around the periphery of the ring member intermediate the surfaces 50 and 51 since the member is preferably cylindrical between these end portions and thus permits free rotation or swivel action in any direction to the extent necessary for the closure member to find its true and perfect seat. In the latter connection, the seating surfaces 53 and 54 of the seat ring and the closure or valve portion 55 of the one-piece stem and disc are also made spherical and of substantially the same radius so that after tilting or rotation of the seat ring 49, seating contact between the closure and seat member will still be circular for continuous fluid sealing contact between these members.

The upper end of the enlarged chamber portion 21 has, of course, been made spherical at 57 in the present form to conform to and provide for a rotative bearing with the spherical upper end of the seat member 49. The top or inner end limit of the plug member 59 is likewise formed spherical at 58 so as to effect a similar support to the spherical lower end of the member.

The sealing medium between the replaceable seat ring 49 and the body 1 constitutes preferably a pair of O-rings 60 which extend around the seat member 49 and are received within the annular grooves 61 and 62, at the top and bottom respectively of the said member as shown. These seals function similarly to those of Fig. 1 and as before, only the uppermost one is effective as a seal depending upon which way the seat ring 49 is positioned. In this instance, however, the sealing is between spherical rather than cylindrical surfaces and the effective O-ring is expanded outwardly slightly, instead of only being displaced slightly downwardly.

The retainer plug 59 is also sealed by means of an O-ring 63 which is received within the annular groove 64 therein, as in the case of Fig. 1. However, in the present form, the O-ring and groove are located towards the bottom of the plug and below the threading 65 between the plug and body thereabove as illustrated. A polygonal head 66 is provided as before for rotation of the plug member into and out of securing position, the upper surface 67 thereof forming a shoulder on the casing to prevent the plug from being turned inwardly as to jam the seat ring and prevent rotation thereof.

The reversible seat ring 49 is axially or ported at 69 and at 70 for fluid flow through the said ring member. No annular relief is necessary in this member because of the extra clearance at 52 therearound. It should be noted, however, that the upper seating surface is relieved at 71 and that the upper and lower surfaces 53 and 54, respectively, are of different spanning dimensions so as to make seating contact with the spherical disc 55 along different portions or segments thereof for the same purpose as described in connection with Fig. 1.

The top of the retainer plug 59 is preferably recessed or relieved at 73 and is provided with a circular positioning finger or projection 74 which fits into the passageway 69 of the seat ring 49 to prevent turning of the latter crosswise within the enlarged chamber 21 while being inserted and brought into position therein.

The seat ring of the latter form is thus relatively loosely held for easy insertion and withdrawal and for free rotative adjustment or shifting in any direction for accurate seating contact with the valve closure and further for permitting rotation with the closure member to prevent galling or undue wear of the latter. The seat ring is readily reversible, affording entirely new seating contact upon reversal as in the first form described. The seat member is also replaceable which applies to the Fig. 1 form as well and besides making the valve renewable permits the use of harder and more desirable metal for this part than would otherwise be justifiable, for longer service. In the latter case, for example, the one-piece stem and disc may have a tip of specially hardened metal for engagement with the seat 49.

It should be clear from the above description that a novel valve has been produced which not only provides for a self-centering, automatically adjustable seat member which is rotatable with the closure to reduce wear and prevent galling, but also for a seat member which is conveniently and easily renewable through the bottom of the valve without necessitating dissassembly or disturbance of the packing. It also provides a structure which is reversible and moreover is adapted to engage the closure member along different portions or segments for effecting wholly new seating contacts and longer valve life.

Although but two forms of the invention have been disclosed, it is not desired to be limited to such forms or to the details of the same, but only by the appended claims read in light of the specification and falling within the spirit of the invention.

I claim:

1. A valve comprising in combination a body, said body being axially recessed and having fluid passages communicating with the said recess, a renewable seat member for said body positioned within said recess therein and having an upwardly facing seating surface and a substantially oppositely disposed downwardly facing seating surface, said seat member being insertable and removable or reversible through a lower open end of the said recess, a removable plug member positioned within the said recess below said seat member for retaining said seat member predeterminately within said recess, said body having internal abutment means limiting upward movement of the seat member therewithin upon contact of the latter member therewith, a valve closure member within the said recess engageable with the seating surface of the said seat member, said seat member being movable in a plurality of directions within said body recess to adjust itself axially to said valve closure during the closing operation to effect accurate seating alignment therebetween, fluid sealing means between said movable seat member and said body, said sealing means comprising a projecting pressure responsive resilient annular member having sealing contact with the body recess at all times, the said sealing means being relatively loosely mounted in grooved portions between said seat and body to permit slight transverse movement of said seat member, said plug member having means engageable with said body to limit the inward movement thereof within said body thereby to define the length of said recess and permitting slight predetermined endwise movement of the said seat member when the valve is open.

2. A valve comprising in combination a body and bonnet, said body being axially recessed, a renewable ported seat member for said body positioned within a portion of said recess, the ported portions of said seat member communicating with the axial recess of said body, said body recess portion being defined at the top by a transverse shoulder, said seat member having an upwardly facing seating surface and a downwardly facing seating surface and being insertable and removable reversible through a lower open end of said recess, a removable member within said recess and below said seat member for retaining said seat member within said recess, said retaining member having a flat upper surface, a valve closure member within said recess engageable with the seating surface of said seat member, said seat member being flat at the top and bottom and being of at least somewhat smaller dimensions than the receiving portion of said recess to permit limited transverse and rotative movement of said seat member therein and above said retainer member for self-adjustment of said seat member to said valve closure during the closing operation for more accurate seating alignment, fluid sealing means between said movable seat member and said body and above and below the ported portions of the said seat member, the said sealing means comprising a pressure responsive resilient ring suitably mounted to provide a fluid seal therebetween while permitting slight transverse movement of said seat member in the valve open position.

3. A valve comprising in combination a recessed body, a renewable seat member positioned within the recess of said body, said seat member having at least one seating surface and being insertable and removable through the lower end of said recess, a removable member engaging said seat member to retain the same within said recess, a valve closure member for cooperation with the seating surface of said seat member, said seat member having upper and lower spherical surfaces, said body being adapted to receive said seat member relatively loosely, said retainer member being adapted to engage said seat member so that the latter member is free to rotate at least a limited amount in any direction and about any axis to permit of self-adjustment of the said seat member to said valve closure member during the closing operation to effect more accurate seating contact therebetween.

4. The subject matter of claim 3 including means between the said body and retainer member to limit the degree of rotatability of said seat member.

5. In a valve, the combination comprising a chambered body, a removable seat member within the chamber of said body, a valve closure member for cooperation with said seat member, said seat member being provided with a plurality of seating surfaces and being removable and positionable within said body whereby to alternatively present selectively seating surfaces for engagement by said valve closure member, said seating surfaces being of different dimensions so as to engage said valve closure member along different areas for effecting substantially new seating contact upon repositioning of said seat member.

6. In a valve, the combination comprising a chambered body, a removable seat member within the chamber of said body, a valve closure member for cooperation with said seat member, said seat member being provided with a plurality of seating surfaces and being removable and positionable within said body whereby to alternatively present selectively seating surfaces for engagement by said valve closure member, said seat member having spherical surface means and being mounted within said body for at least limited rotational movement in any direction and about an axis to provide for self-adjustment and alignment of the said seat member with said valve closure member during the closing operation to effect more accurate seating therebetween, the said seat member being free to rotate with said closure to reduce wear and minimize galling action at the respective seating surfaces.

References Cited in the file of this patent

UNITED STATES PATENTS

| 291,066 | Maxwell | Jan. 1, 1884 |
| 424,715 | Knickerbacker | Apr. 1, 1890 |
| 663,231 | Jewett | Dec. 4, 1900 |
| 953,940 | Beam | Apr. 5, 1910 |
| 1,374,621 | Wicker | Apr. 12, 1921 |
| 1,391,403 | Rapp | Sept. 20, 1921 |
| 1,812,104 | Mason | June 30, 1931 |
| 1,985,382 | Schachter | Dec. 25, 1934 |
| 2,059,370 | Lane | Nov. 3, 1936 |
| 2,330,610 | Natter | Sept. 28, 1943 |
| 2,628,571 | Neilson | Feb. 17, 1953 |